United States Patent [19]
Folkenroth et al.

[11] 3,853,156
[45] Dec. 10, 1974

[54] INSULATION STRIPPER AND WIRE SEPARATOR FOR TWISTED WIRE PAIRS

[75] Inventors: Earl Earnest Folkenroth; Robert Ullman, both of Harrisburg, Pa.

[73] Assignee: AMP Incorporated, Harrisburg, Pa.

[22] Filed: Apr. 11, 1974

[21] Appl. No.: 459,982

Related U.S. Application Data

[62] Division of Ser. No. 258,334, May 31, 1972.

[52] U.S. Cl. ................................. 140/149, 81/9.51
[51] Int. Cl. .......................................... B21f 21/00
[58] Field of Search .................. 140/1, 149; 81/9.51

[56] References Cited
UNITED STATES PATENTS

| | | | |
|---|---|---|---|
| 1,722,087 | 7/1929 | Hartman | 81/9.51 |
| 1,844,766 | 2/1932 | Keller | 81/9.51 |
| 2,915,928 | 12/1959 | Felts et al. | 81/9.51 |
| 3,003,375 | 10/1961 | Hopkins | 81/9.51 |
| 3,779,290 | 12/1973 | Rich et al. | 140/149 |

Primary Examiner—Lowell A. Larson
Attorney, Agent, or Firm—Frederick W. Raring; Jay L. Seitchik; William J. Keating

[57] ABSTRACT

Apparatus for untwisting and stripping the ends of wires in a twisted pair comprise a first clamp which clamps the pair and a pair of cooperable insulation cutting blades which serve as a second clamp. Twisted pair is engaged by clamps and second clamp is rotated in untwisting direction. After untwisting, wires are pulled from second clamp to strip insulation.

7 Claims, 19 Drawing Figures

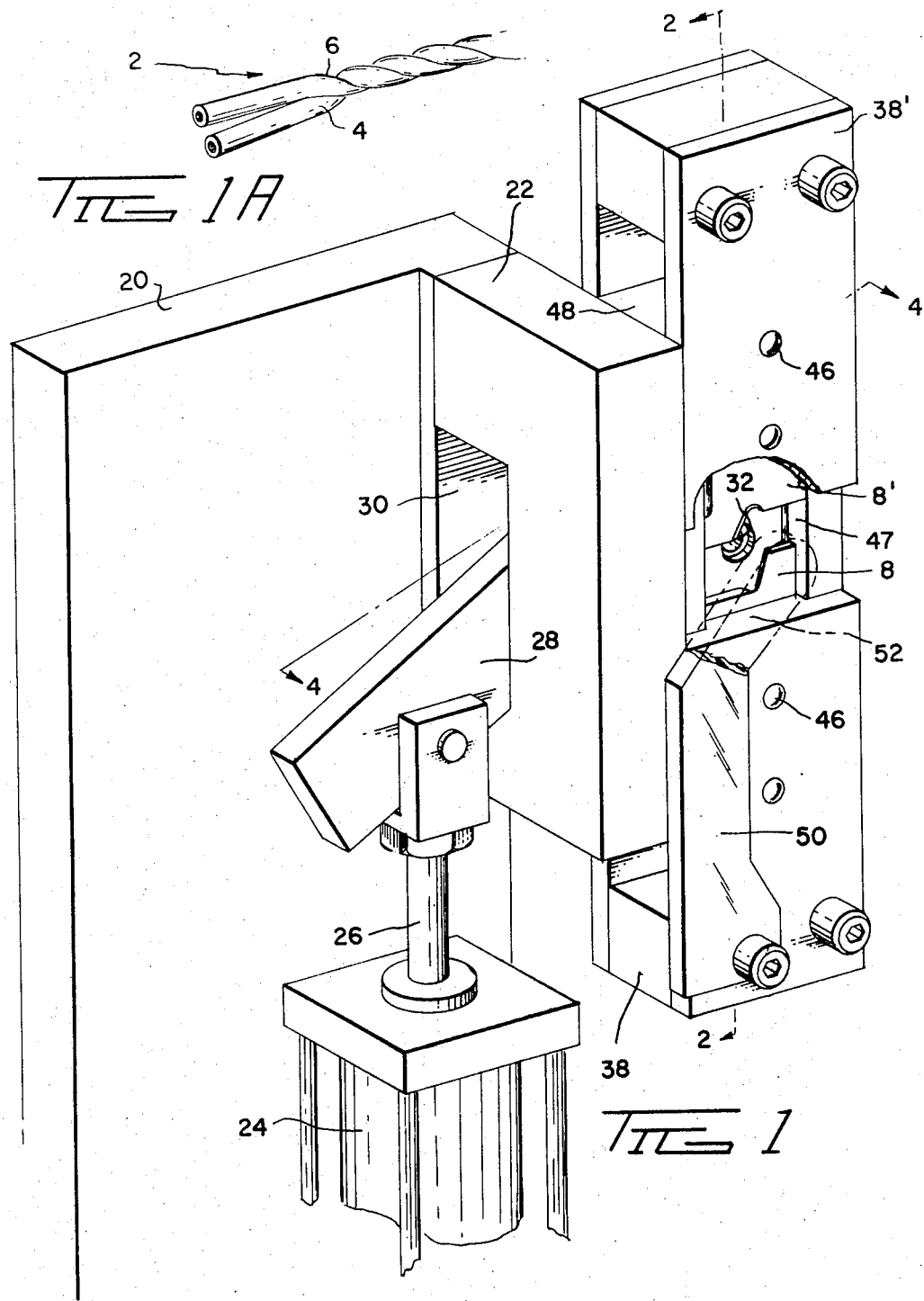

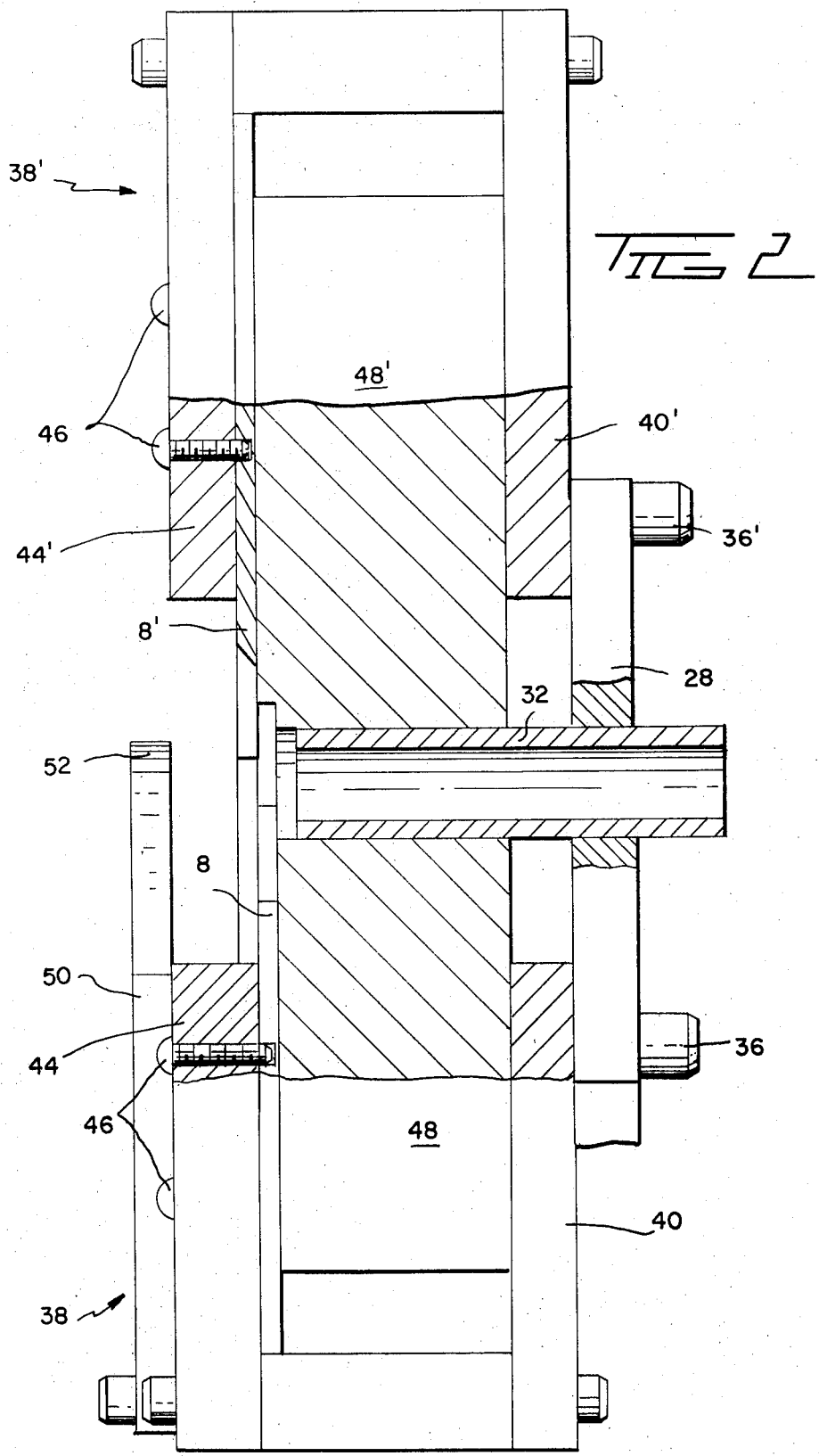

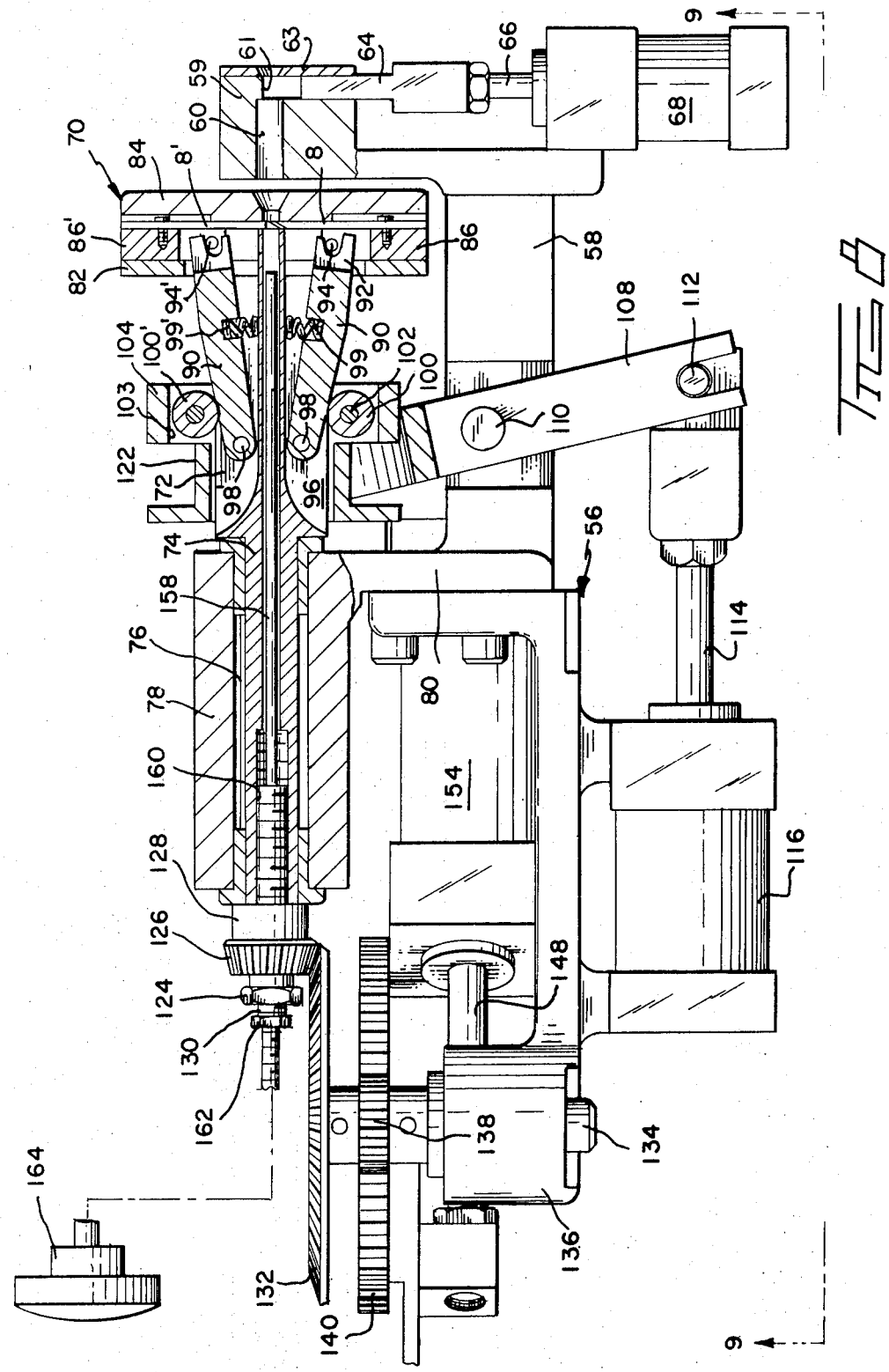

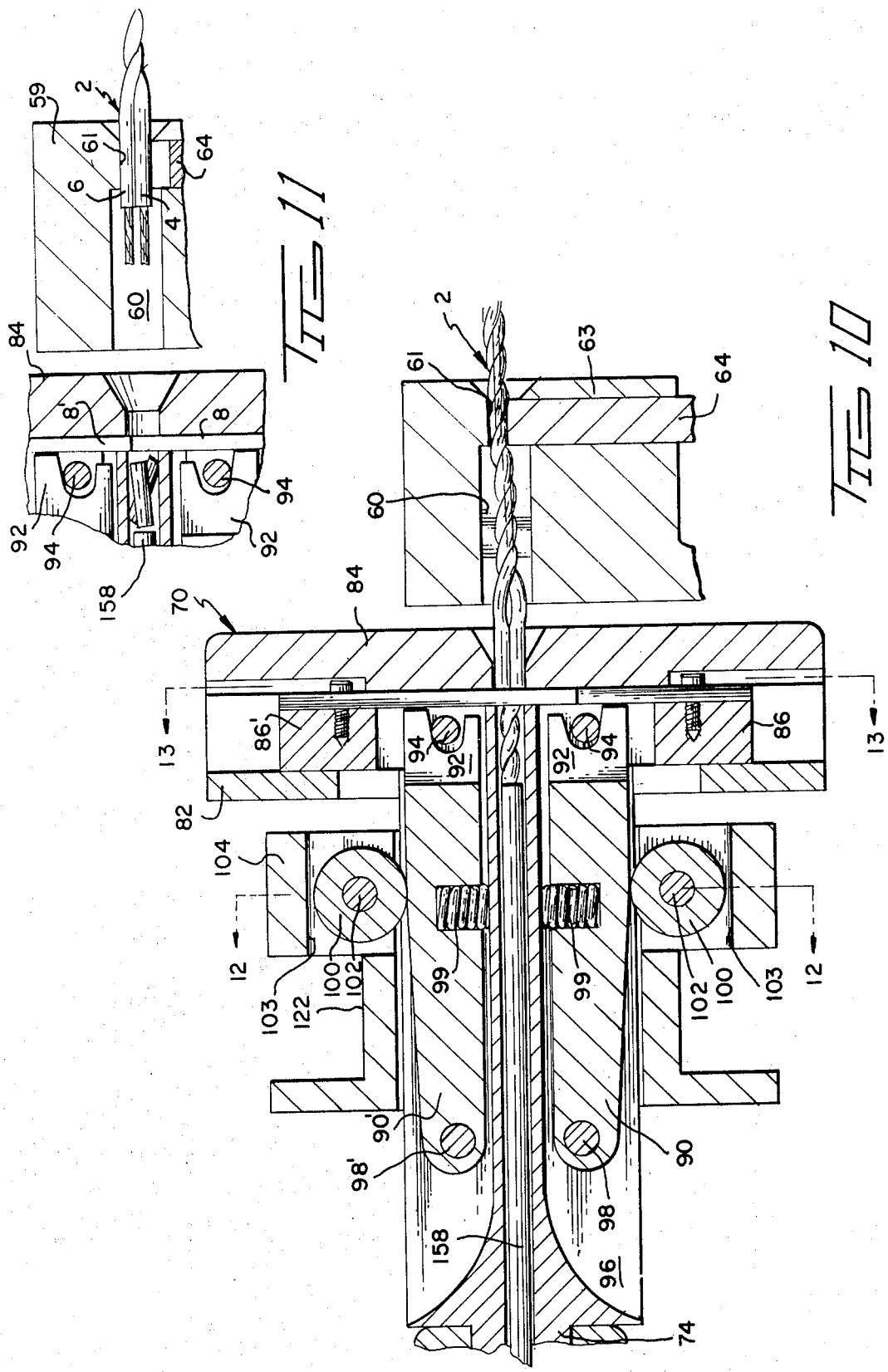

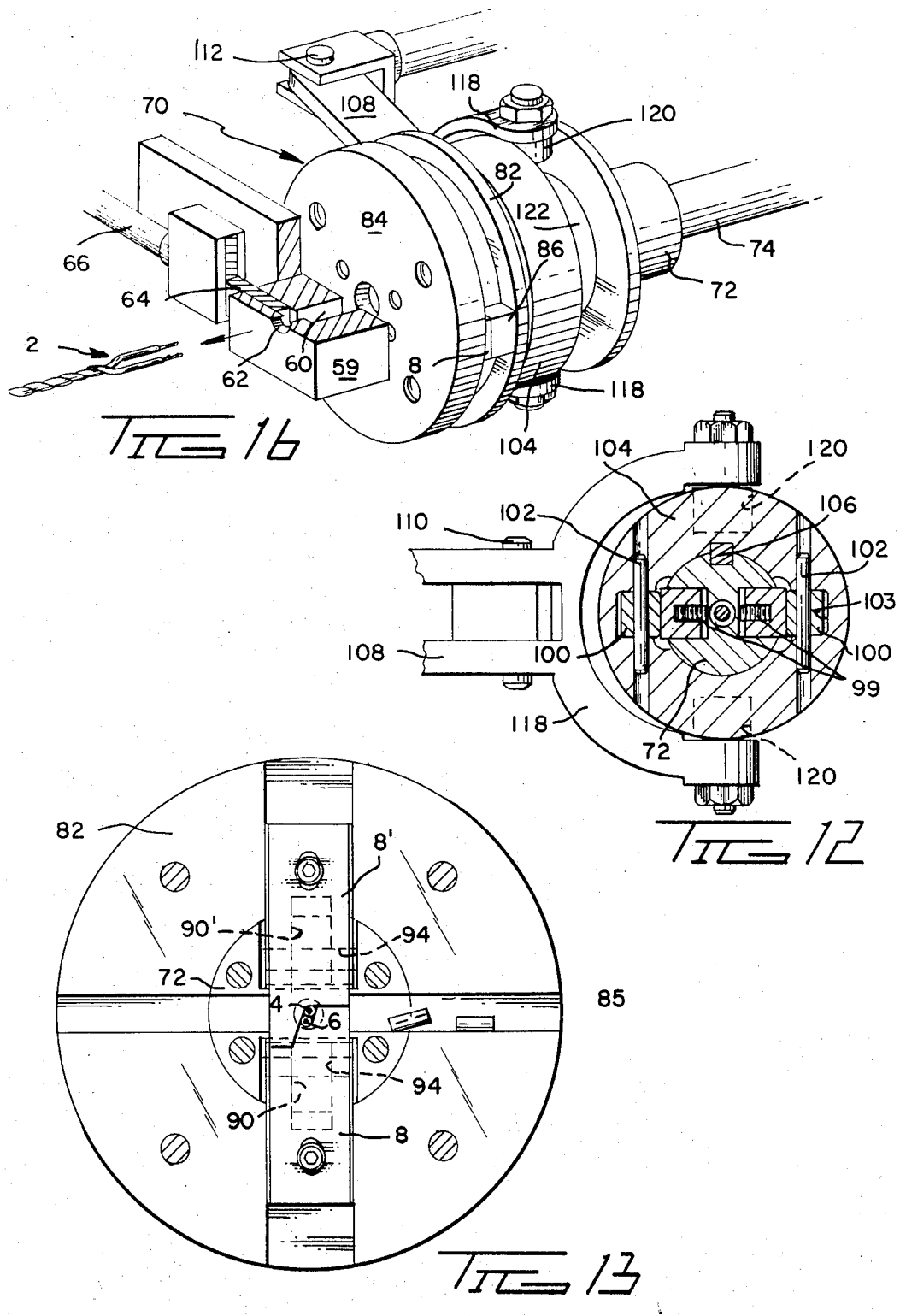

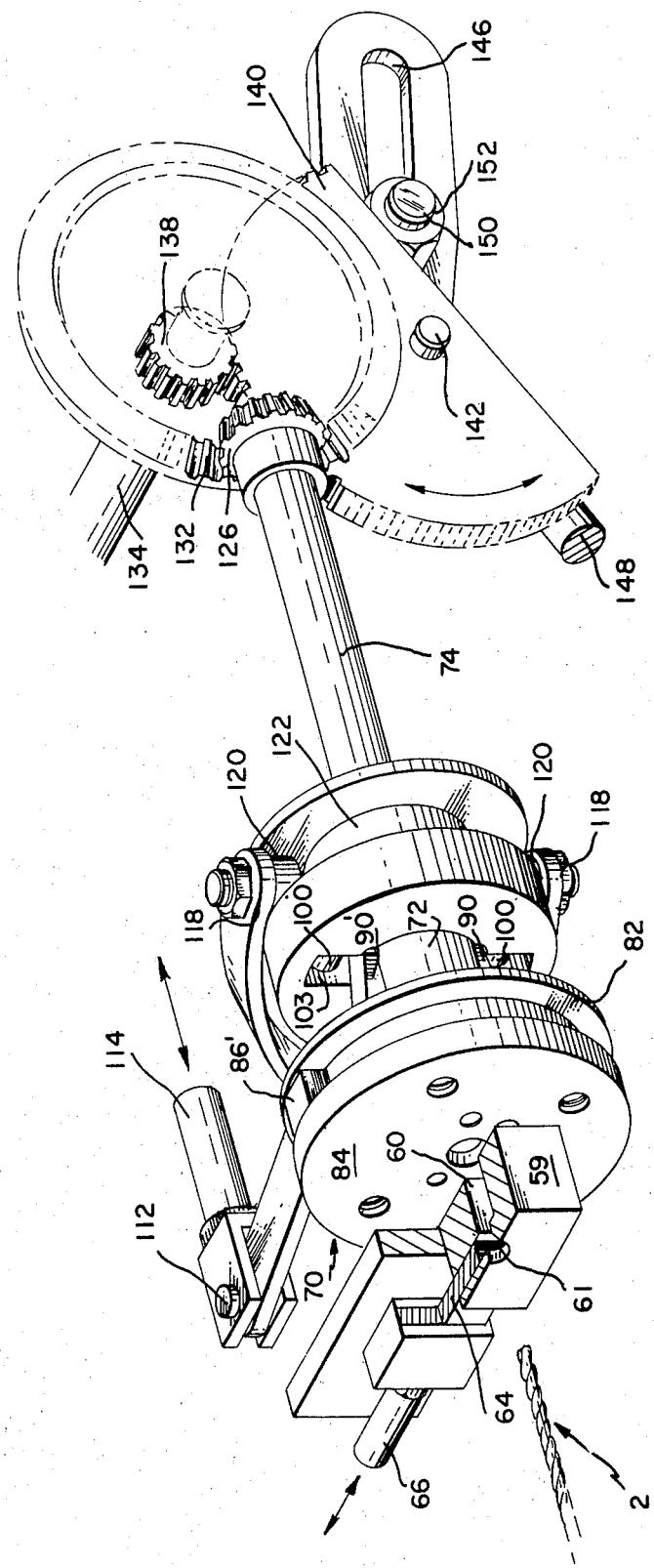

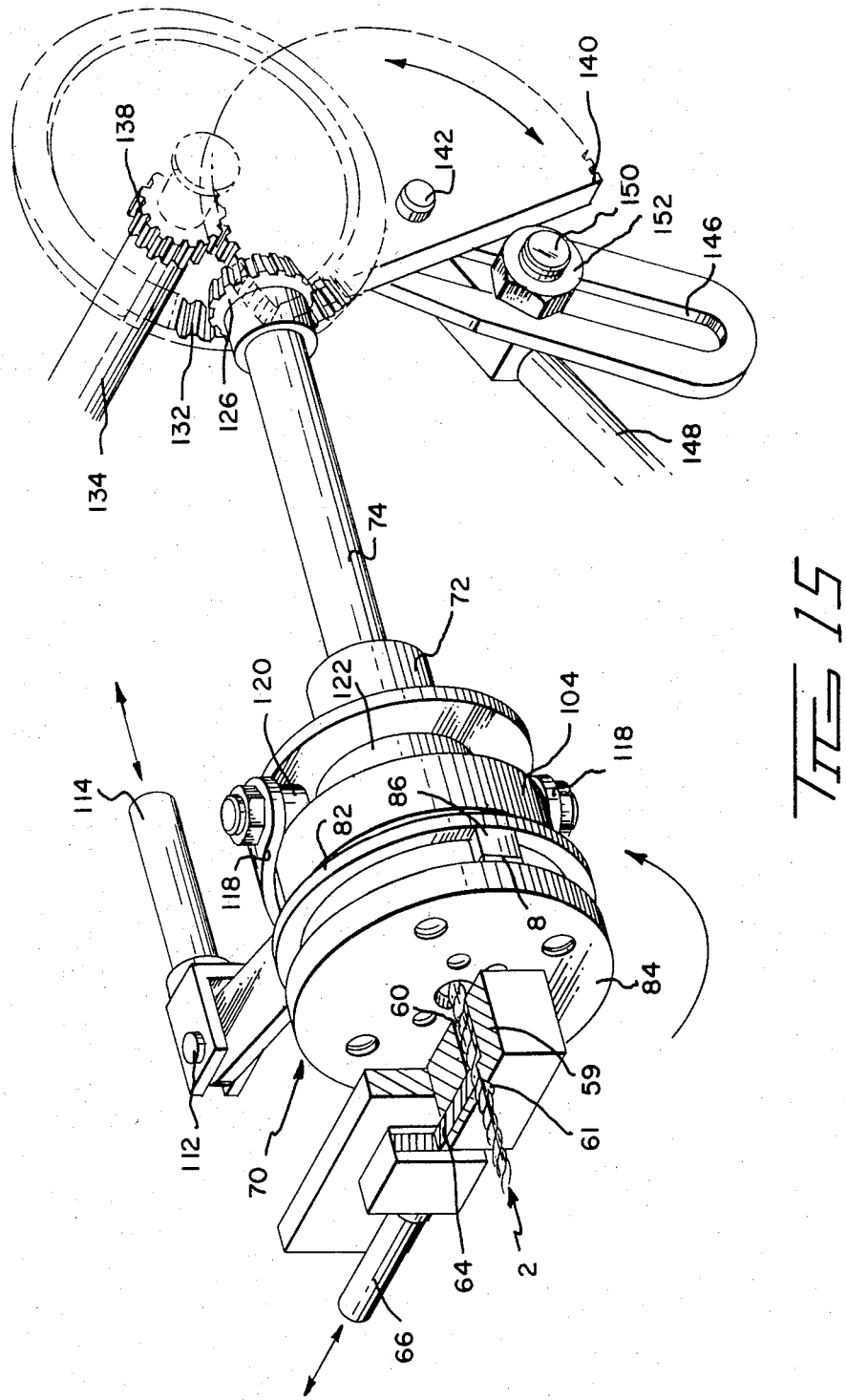

3,853,156

INSULATION STRIPPER AND WIRE SEPARATOR FOR TWISTED WIRE PAIRS

BACKGROUND OF THE INVENTION

This application is a Division of application Ser. No. 258,334 filed May 31, 1972, now U.S. Pat. No. 3,815,449, 6-11-74.

Insulated wires are frequently provided as twisted wire pairs, that is, two individual wires which are twisted helically together. Twisted wire pairs are wisely used in the electrical industry for several reasons; for example, if two wires in a circuit are twisted together, wire to wire inductance effects are minimized and cross-talk between adjacent wire pairs is reduced or eliminated. In addition, if two associated wires are twisted together in a harness, rather than separately incorporated into the harness, a more compact and neater wiring harness is achieved and the tracing and identification of the wires is simplified.

The present invention is directed to the achievement of an improved apparatus which is capable of simultaneously untwisting the wires in a pair and stripping the insulation from each wire in a twisted wire pair. Such insulation stripping and pair untwisting operations must be carried out repeatedly in any harness making or wiring operation where twisted wire pairs are used. In the past, it has been common practice to prepare the ends of the wires of a twisted pair for termination by manually untwisting the wires and then individually stripping insulation from the end of each wire It is accordingly an object of the invention to provide an improved wire untwisting apparatus. A still further object is to provide an apparatus capable of untwisting the wires of a twisted pair, stripping insulation from the end of each wire of the pair, and separating the two wires so that they can be individually terminated or connected in a circuit.

These and other objects of the invention are achieved in a preferred embodiment of the invention comprising a pair of insulation stripping blades which are movable relatively towards and away from each other along a predetermined path which is at least substantially rectilinear. When the blades are closed, they cut through the insulation of the wires and in their closed condition, they serve as a clamp for the pair of wires. The untwisting mechanism includes an additional clamp which grasps the wires adjacent to the stripping blades. Mechanism is provided for rotating the blades relative to the clamp to untwist the wires. After untwisting, the wires are moved axially from between the blades to strip the insulation from the wire ends.

In the drawing:

FIG. 1 is a perspective view of a twisted pair insulation stripping apparatus in accordance with the invention.

FIG. 1A is a perspective view of a short section of a twisted wire pair.

FIG. 2 is a view taken along the lines 2—2 of FIG. 1, this view showing the positions of the parts on the insulation stripping blades are in their opened or separated positions.

FIG. 8 is a top plan view, partially in section, of a preferred form of apparatus for both stripping the end portions of the wires in a twisted pair and untwisting the wires at the end of the pair.

FIG. 10 is an enlarged sectional view of the stripping head of the apparatus of FIG. 8 showing the positions of the parts at an intermediate stage of the operating cycle.

FIG. 11 is a fragmentary view illustrating the removal of the stripped and untwisted pair from the apparatus at the conclusion of the operating cycle.

FIGS. 12 and 13 are views taken along the lines 12—12 and 13—13 of FIG. 8.

FIG. 14 is a perspective view showing the stripping and untwisting head, the camming ring which controls the stripping blades, and the drive train for the camming ring and the stripping head, this view showing the positions of the parts at the beginning of the operating cycle.

FIGS. 15 and 16 are views similar to FIG. 14 but showing the positions of the parts at different stages of the operating cycle.

THE EMBODIMENT OF FIGS. 1—7

Figure 5:
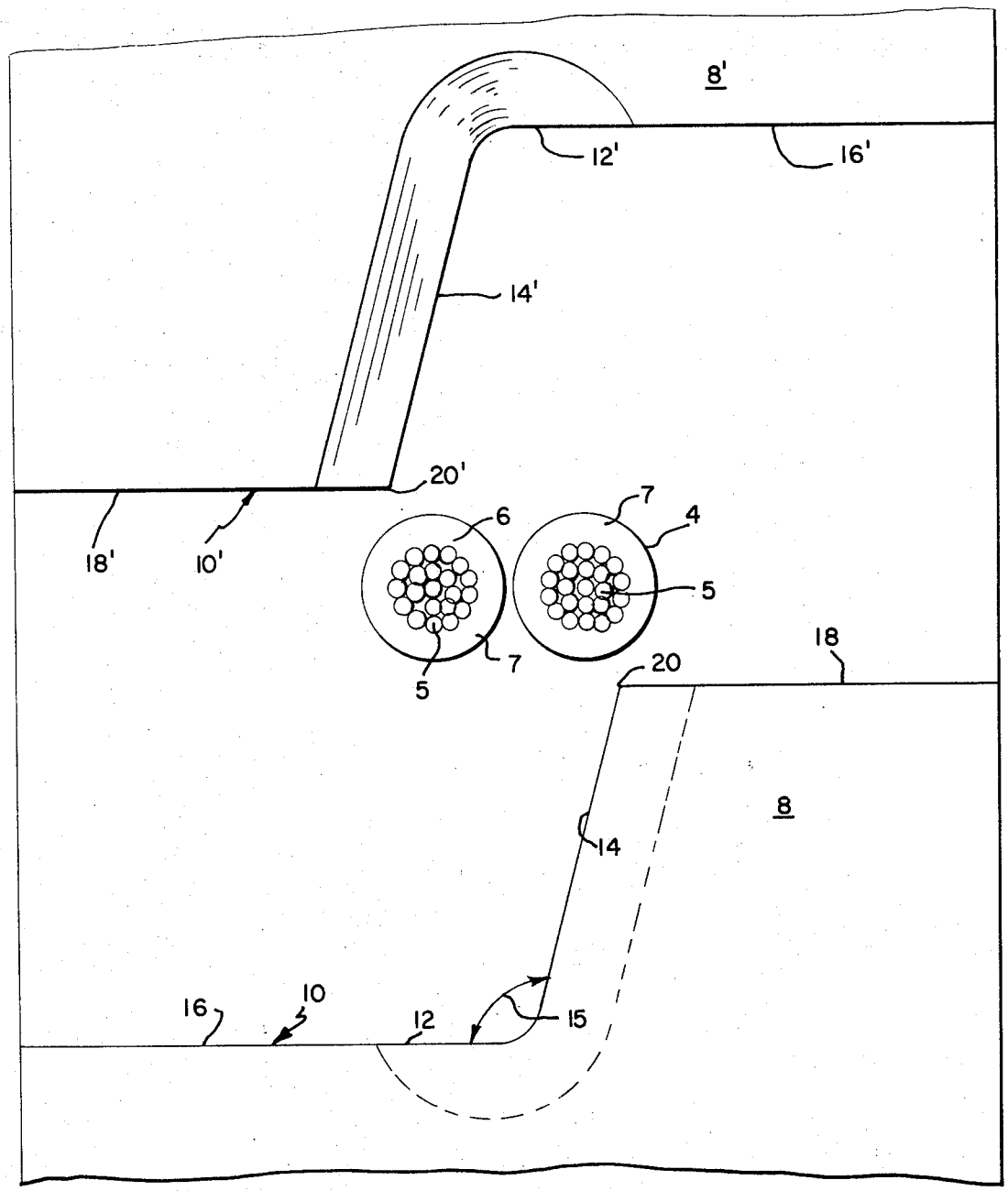
FIG. 5 is a fragmentary plan view, on an enlarged scale, of the insulation stripping blades of the apparatus of FIG. 1, this view showing the blades and their fully open or separated positions.

Referring first to FIG. 1A, a conventional twisted pair 2 of insulated conductors comprises two individual wires 4, 6 which are helically intertwined. Each wire has a central metallic core 5 and an insulating sheath 7 as shown in FIG. 5. When the end of a twisted wire pair is to be electrically connected in a harness, or when terminals are to be crimped onto the ends of the wires, it is necessary to strip the end portions of each wire 4, 6, and usually, to separate the wires adjacent to the end of the pair.

In the description which follows, a relatively simple stripping apparatus for stripping insulation from the ends of the wires 4, 6 will first be described and there will then be described an apparatus for both stripping the wire ends and simultaneously separating the two wires at the end of the pair. The stripping blades and the stripping apparatus shown in the stripping and untwisting device of FIG. 8 is substantially similar to the simple insulation stripping device of FIGS. 1-7. Under some circumstances, it is necessary to only strip the insulation while in some harness making operations, both the stripping and untwisting operations are required.

Referring first to FIG. 5, one pair of insulation stripping blades 8, 8' in accordance with the invention are in the form of flat relatively thin plate like members and are mounted for movement towards and away from each other along a straight line, or substantially straight line, path. The opposed ends 10, 10' of the blades each have first cutting edges 12, 12' which extend transversely of the path of movement of the blades and second cutting edges 14 which extend forwardly from the edges 12, 12' and slightly divergently with respect to the path of movement of the blades. For reasons which will become apparent as this description proceeds, the included angle 15 between the edges 12, 14 and 12', 14' is at least slightly greater than 90° and no greater than about 120°.

The cutting edge 12 merges with a leading end portion 16 of the blade 8 that extends laterally to the side of the blade and the cutting edge 14 merges with a leading end portion 18 which also extends transversely, the edge 14 and the end portion 18 defining a point of intersection 20 which is located, in the case of the blade 8, slightly to the right of the common center line of the two blades. The blade 8', the upper blade, is similar to the blade 8 but is formed in a lefthand sense so that its leading end portion 18' is on the lefthand side of the center line and its leading end portion 16' is on the righthand side of the center line.

At the beginning of a wire stripping operation, the blades 8, 8' will be spaced apart as shown in FIG. 5 and the wire pair will be positioned between the blades. As the blades move relatively towards each other, the intersection points 20, 20' will each engage one of the wires of the pair, turn the portion of the wire pair which is between the blades such that a line connecting the centers of the two wires will be parallel to the cutting edges 14, 14' and will be located mid-way between these cutting edges as shown in FIG. 7.

Figure 7:
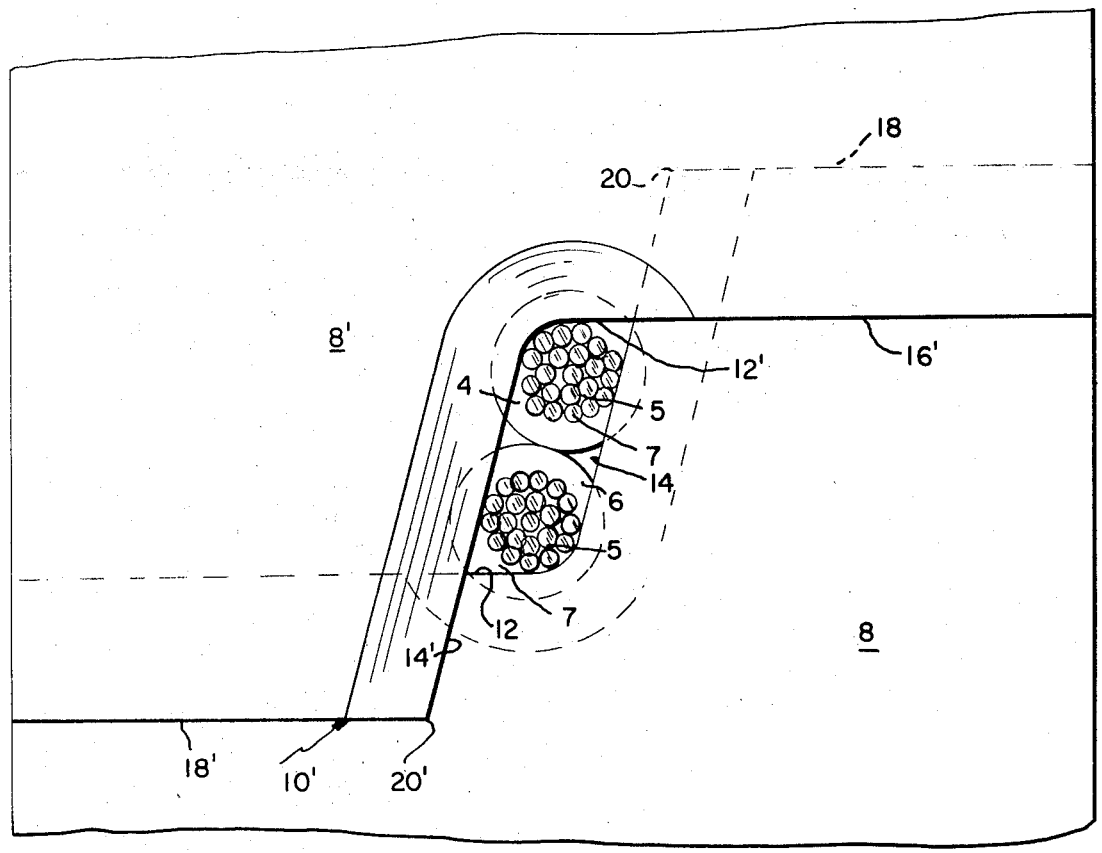
FIGS. 6 and 7 are views similar to FIG. 5 illustrating the manner in which the blades close around the twisted wire pair and cut through the insulation of wires of the pair.
Figure 3:
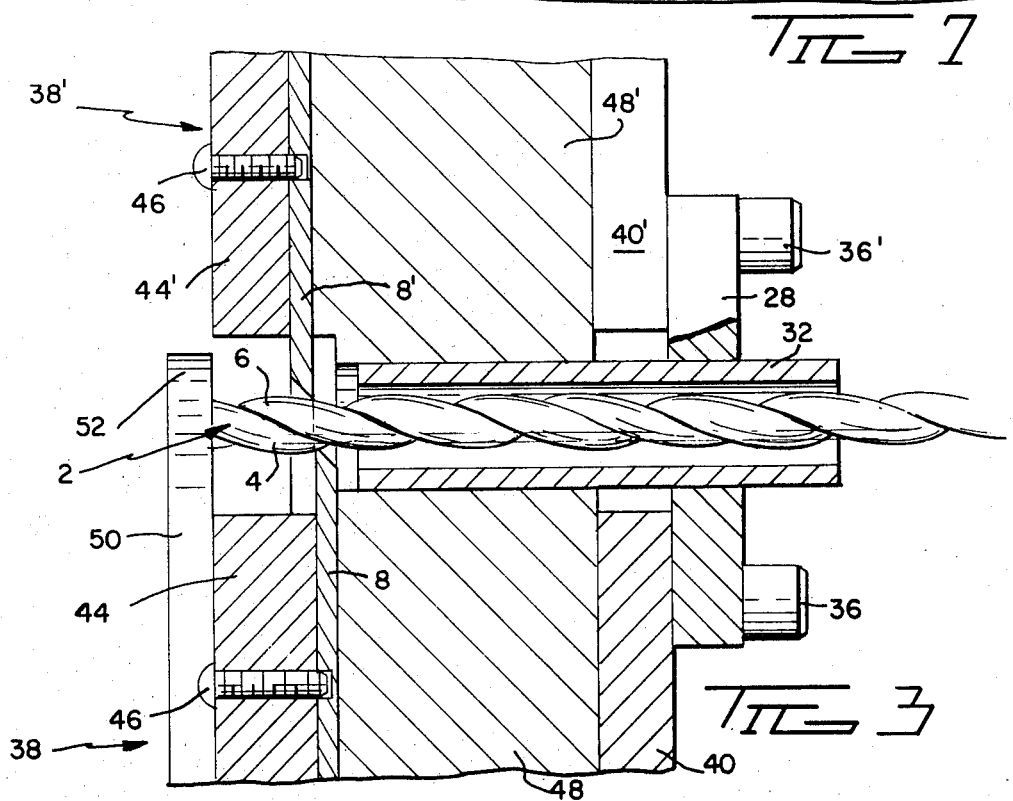
FIG. 3 is a view similar to FIG. 2 but showing the insulation stripping blades in their closed positions.
Figure 4:
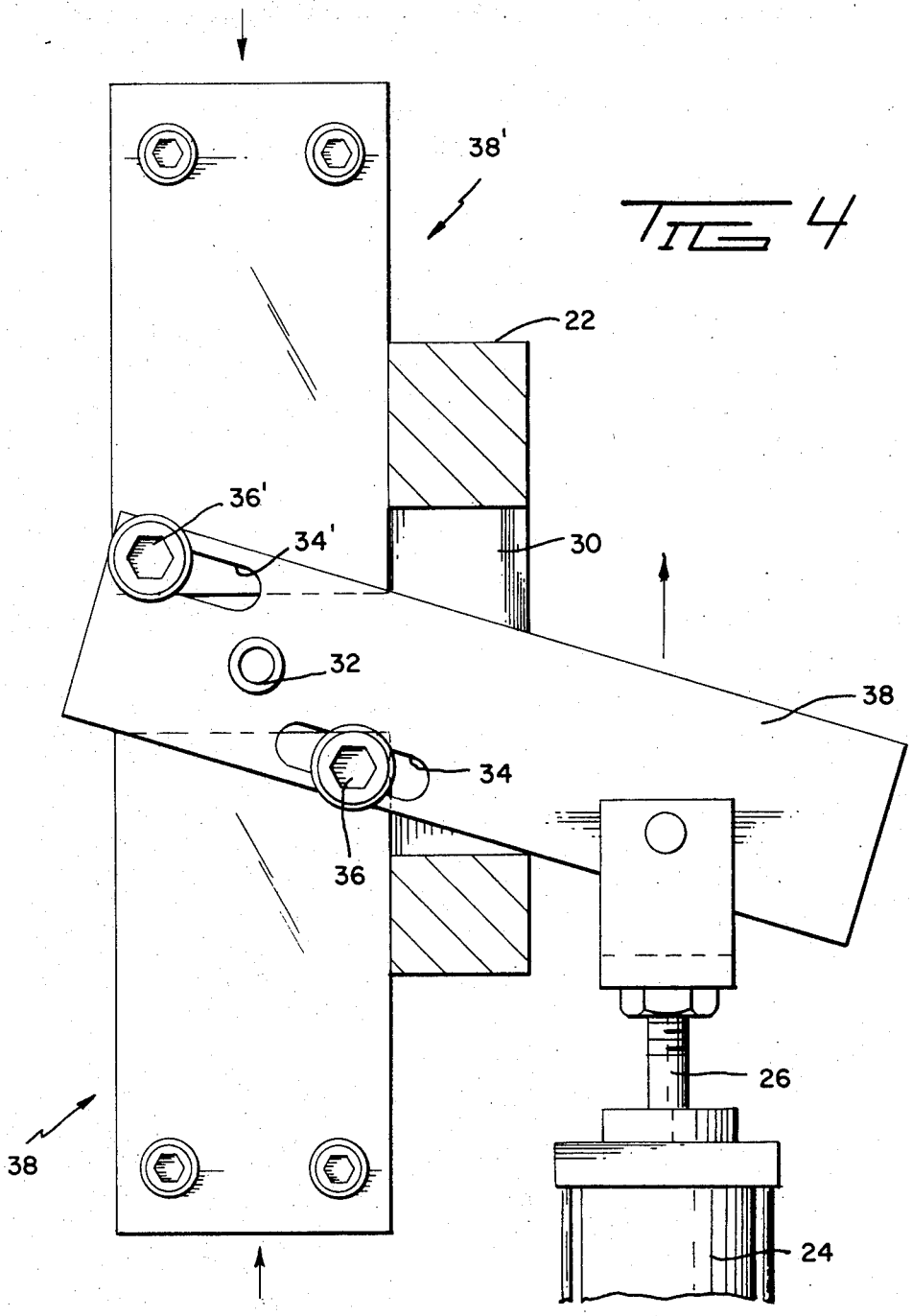
FIG. 4 is a view taken along the lines 4—4 of FIG. 1.

After the blades have moved to their fully closed positions, FIG. 7, the reoriented wire pair will be captured between the cutting edges 14, 14' and 12, 12' and these cutting edges will have penetrated the insulation of each wire as shown in FIG. 7. The twisted pair can then be pulled axially from between the blades thereby to cause tearing of the insulation in the plane defined by the cutting edges so that the severed sections of insulation will be held by the blades and the stripped wire ends will be pulled from the blades.

It will be apparent from FIG. 7 that the blades 8, 8' must not move beyond their closed positions as shown in FIG. 7 if nicking or cutting of the strands of the conducting cores 5 of the wires is to be avoided. In order to prevent such cutting of the strands, the leading end portions 14, 18 and 16', 18' of the blades are carefully machined so that they will abutt each other and act as positive stops to define the limits of movement of the blades.

It should be explained that the orientation of the pair will be random at the beginning of the operating cycle and FIG. 5 shows most undesirable orientation. If the pair is oriented such that one wire is on top of the other wire, or nearly so, the reorientation of the wires as illustrated in FIG. 6 will not take place.

Figure 6:
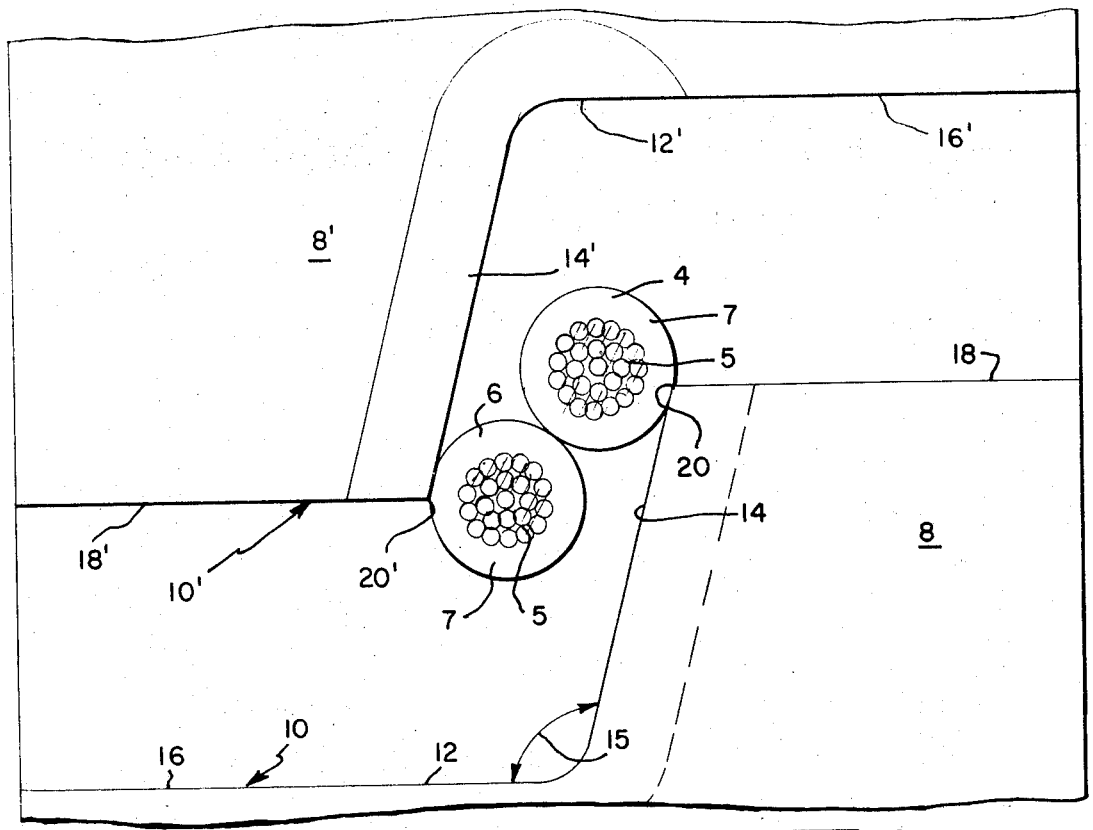

The reorientation of the wires as shown in FIG. 6 is affected by the intersections 20, 20' of the edges 14, 14' with the ends 18, 18' of the blades. It follows that these intersections 20, 20' must be spaced from the common center line of the two blades by a distance which is less than the diameter of one of the wires so that the intersections will engage the wires when the blades move towards each other.

It should also be noted that the successful practice of the invention requires the long cutting edges 14, 14' should extend in the general direction of the path of movement of the blades. The shorter or first cutting edges 12, 12' are of lesser importance and may not be essential for successful insulation stripping under some circumstances as described below.

It will be apparent from the foregoing that certain dimensions of the blades are important for successful practice of the invention as is true of all insulation stripping operations. Thus when the blades are closed as shown in FIG. 7, cutting edges 14, 14' are spaced apart by a distance substantially equal to, but no less than, the diameter of the insulated core of each wire of the pair. The cutting edges 12, 12' are spaced apart by a distance equal to twice the diameter of the core of each wire plus twice the thickness of the insulating sheath of each wire. Where the insulation is of the commonly used plastic variety, such as vinyl, it will tear during pulling of the pair and be separated in those areas in which it is not cut through to the wire core 5. This technique of partial cutting coupled with tearing of the insulation is employed in many known insulation stripping devices.

As noted previously, the included angle 14 should be in the range of slightly greater than 90° to about 120°. This angle is not critical but best results will be achieved if an angle of optimum extent is shown. It has been found that good results will be achieved with an included angle of about 105°, which is approximately the angle shown in the drawing. If the included angle is about 105°, and the proportions are those of the drawing, the intersections 20, 20' will be properly located to engage the wires.

Many desirable types of positive stops for the blades may be employed. In the embodiment of FIGS. 1–7, the ends 18, 16, 16', 18' are carefully ground so that they will function as a stop to define the closed positions of the blades. Alternatively, the leading ends of the blades can be designed such that they will overlap when the blades are in their closed condition and a different type of stop than that shown can be used.

Figure 7A:
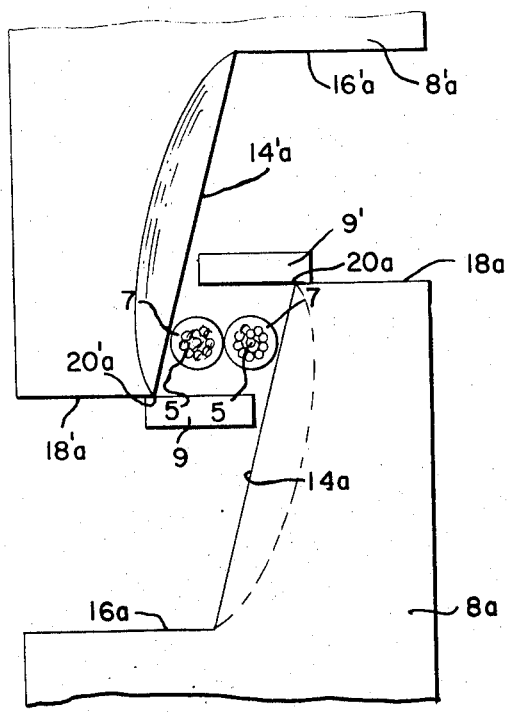
FIG. 7A and 7B show alternative types of stripping blades in accordance with the invention.
Figure 7B:
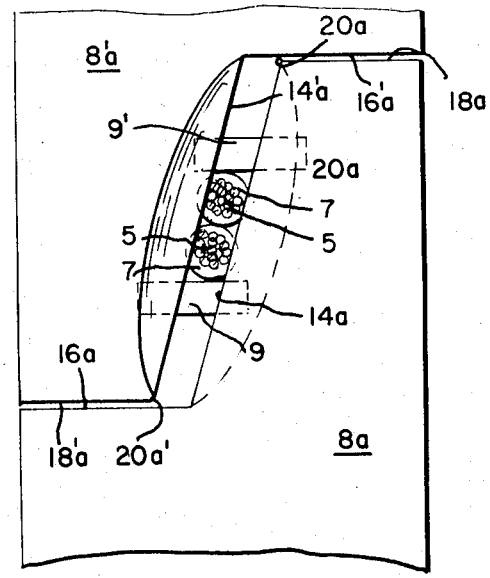
Figure 9:
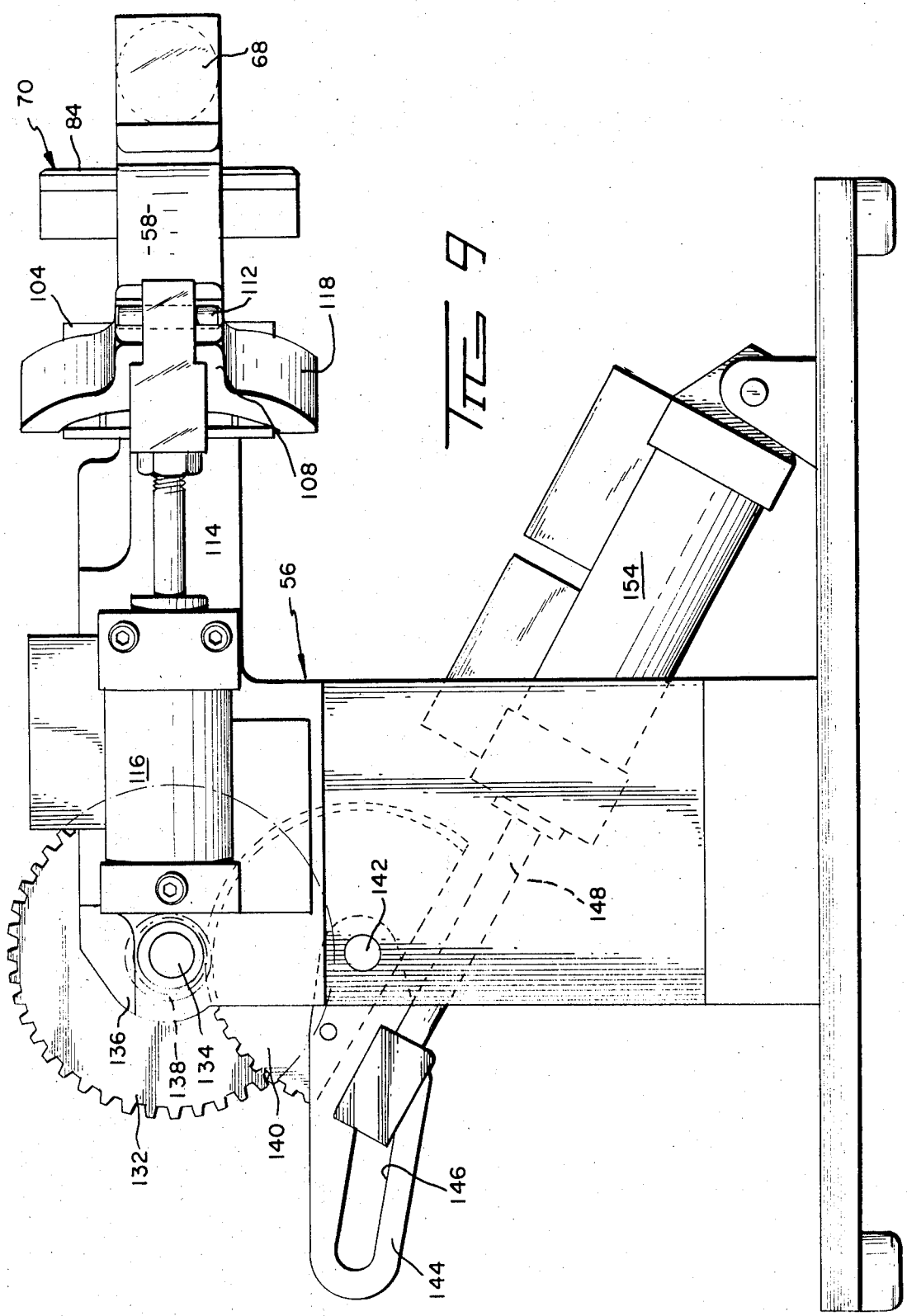
FIG. 9 is a side view looking in the direction of the arrows 9—9 of FIG. 8 of the apparatus.

The insulation stripping blades described above are preferred under most circumstances, but the alternative blades shown in FIGS. 7A and 7B may be used under some conditions. The blades 8a, 8' of this embodiment have leading ends 18a, 18' which overlap when the blades are in the open condition, FIG. 7A. These blades have cutting edges 14a, 14a' as provided in the previously described embodiment, but the edges 16a, 16a' are not ground to cutting edges. It is desirable, when blades of the type shown in FIG. 7A are used, to provide stationary stops 9, 9', which function to confine the twisted pair of wires.

In use, the twisted pair is located as shown in FIG. 7A and the blades are then moved to their closed position, FIG. 7B. During such movement, the edges 14a, 14a' turn the pair and reorient it if necessary. When the blades are fully closed, the edges 14a, 14a' will have penetrated the insulation as shown in FIG. 7B and the insulation can be stripped by simply pulling the wire pair from between the blades.

The embodiment shown in FIGS. 7A and 7B demonstrates that the cutting edges 12, 12' of the previous embodiment are not essential, although these shorter cutting edges are desirable under many circumstances. This embodiment also demonstrates that the pair can be reoriented by the cutting edges which extend obliquely of the blades the edges 14a, 14a' rather than the corners 20, 20'.

The overlapping blades would be advantageous in an automatic of the type in which wire is fed from a reel along a path extending between a pair of open insulation stripping blades which are closed after the wire has been fed. The overlapping blades would provide a convenient means of confining the wire pair during the wire feeding operation.

Referring now to FIG. 1, a relatively simple apparatus for the stripping wire pairs comprises a frame plate 20 having a laterally extending arm 22 thereon and having a piston cylinder 24 secured thereto. The piston rod 26 of the piston cylinder is pivotally connected to a lever 28 which extends through an opening 30 in the frame arm 22. Arm 28 is pivoted on a bushing 32 extending a fixed plate 48 described below. On each side of this bushing, the arm has a pin-slot connection 34, 35, 34', 36' with each of two generally U-shaped blade holders 38, see FIG. 4. The lower blade holder comprises two spaced apart plates 40, 44 which are joined at their lower ends by a spacer block 42. The side plates 40, 44 are disposed generally against the opposite sides of the previously identified bearing block 48 which is integral with, and extends laterally from, the frame arm 22. The lower insulation stripping blade 8 is fixed to the side plate 44 by means of fasteners 46. As shown in FIG. 1, a vertical groove or channel 47 is provided in the block 48 which receives the blade 8 and portions of the plate 41 in order to guide the blade holder and the blade along a straight line path drawing movement toward the upper blade holder. The upper blade holder 38' is similar to the lower blade holder 38 and need not be described in detail. It will be apparent from FIG. 4 that during outward movement of the piston rod 26, the lever 28 will be moved through a counterclockwise arc as viewed in FIG. 4 about its pivotal axis 32 to move the two blade holders 38, 38' and the blades 8, 8' towards each other.

The previously identified bushing is mounted in the bearing block 48 and serves as a guide for the twisted pair which is inserted into the bushing from the left in FIG. 2. In the disclosed embodiment, a stop is provided at 52 (FIG. 1) to gauge the amount of insulation stripped from the wire. This stop is integral with an arm 50 mounted on side block 44 by a fastener as shown.

In the use of the apparatus of FIGS. 1-7, the operator merely inserts the wire through the bushing 32 until the wires engage at stop 52. Thereafter, the operator actuates the cylinder 24 by means of a suitable switch or valve (not specifically shown) to cause movement of the blade holders and the blades towards each other until the blades are in their closed condition. The operator then pulls the wire leftwardly as viewed in FIG. 3 while the blades are closed.

THE EMBODIMENT OF FIGS. 8-16

FIGS. 8-16 show an apparatus which incorporates twisting pair insulation stripping blades in accordance with FIGS. 1-7 in combination with means for untwisting the end portion of the pair. This apparatus comprises a supporting frame generally indicated at 56 having a forwardly extending arm 58 on the end of which there is mounted a wire pair clamping block 59. An opening 60 extends through this clamping block towards the stripping and untwisting head 70 described below. A face plate 62 secured to the forwardly facing (rightwardly facing in FIG. 8) side of the block 59 has a tapered opening 63 to guide the twisted pair 2 through the opening 60 into the head 70. After insertion of the pair into the opening 60, the pair is clamped by a clamping ram 64 which is slidably mounted in a laterally extending recess in block 59. This ram is mounted on the end of a piston rod 66 of a pneumatic piston cylinder 68. The opening 60 has an offset surface 61 adjacent to the face plate 62 and in alignment with the clamping ram 64 so that the inserted pair will be clamped in a position such that it will extend centrally through the opening 60.

The stripping and untwisting head 70 is mounted on, and keyed or otherwise secured to, an enlarged diameter forward portion 72 of a hollow rotatable shaft 74 which extends rearwardly through a suitable bearing 76 in a support boss 78 on the end of an arm 80 of the frame 56. The head 70 comprises a cylindrical body portion 82 having a circular face plate 84 secured to its rightwardly facing side by fasteners as shown in FIG. 13. The body portion 82 has two diametrically opposed radially extending slots therein in which are contained blade holder blocks 86, 86'. Stripping blades 8, 8' which may be similar, or substantially similar, to the blades shown in FIGS. 1-7, are secured to the blocks 86, 86' so that when the blocks move inwardly toward the axis of the shaft 74, the blades will be moved from their opened positions to their closed positions. The body portion 82 also has radially extending slots 85 (FIG. 13) extending normally of the slots in which blade holder blocks are contained. The slots 85 permit ejection of the sections of insulation removed from the wire ends as will be described below.

The hollow shaft 74 is axially aligned with the opening 60 and the face plate 84 is provided with a central opening 88 so that a wire inserted through the clamping block 59 will enter the shaft and be centrally located between the blades 8, 8'.

The blade holder blocks 86, 86' are moved relatively towards each other from the position of FIG. 8 to the position of FIG. 10 by means of arms 90, 90', the ends 92 of which are slotted for the reception of pins 94 extending across recesses in the blocks 86, 86'. The body portion 82 of the head 70 has openings through which these arms extend. Arms 90, 90' are mounted in axially extending recesses 96 in the enlarged diameter portion 72 of shaft 74 by means of pivot pins 98, 98' and the arms are normally biased to the position shown in FIG. 8 by springs 99 which bear against the arms intermediate their ends and against the floors of the recesses 96.

Arms 90, 90' are swung inwardly and towards each other to close the stripping blades by camming rollers 100, FIGS. 8 and 12 mounted on pins 102 which extend across recesses 103 in a camming collar 104. This camming collar is keyed as shown at 106 (FIG. 12), by an axially extending key to the enlarged diameter portion 72 of the shaft to that the collar will rotate with the shaft and is permitted to move axially on the shaft from the position of FIG. 8 to the position of FIG. 10 thereby to swing the arms inwardly. Axial sliding movement of the collar 104 is achieved by means of a lever 108 pivoted intermediate its ends at 110 to the frame and having a pin slot connection 112 at its outer end with a clevis on the end of a piston rod 114 extending from a piston cylinder 116 which is mounted on the side of the frame. The inner end of the lever 108, that is the end proximate to the collar 104 has an integral yoke 118, the ends of which are on opposite sides of the collar and on which there are mounted rollers 120. These rollers are received in a circumferential recess 122 in the collar, an arrangement which permits rotation of the collar and which permits axial movement of the collar on the shaft. It will be apparent from FIG. 8 that upon leftward movement of the piston rod 114, the lever 108 will be swung in a clockwise direction and the collar will be moved rightwardly to the position of FIG. 10.

The shaft 74 is rotated several turns during each operating cycle by a gear train which includes a beveled pinion 126 having an integral hub 128. This pinion is mounted on the projecting lefthand end portion of the shaft 74, the extreme end portion of the shaft being threaded as shown at 130 and a lock nut 124 being employed to maintain the pinion in place. The pinion is keyed or otherwise secured to the shaft 74 for rotation therewith.

The pinion 126 meshes with a bevel gear 132 which is secured to a shaft 134 for rotation therewith. Shaft 134 extends laterally and is supported in a suitable bearing boss 136 integral with the frame 156. A pinion 138 is fixed on the shaft 134 for rotation therewith between the bevel gear 132 and the boss 136. Pinion 138 meshes with a gear section 140 which is keyed or otherwise secured to a rotationally mounted stub shaft 142. Stub shaft 142 (FIG. 14) is suitable supported for a rotation in the frame immediately beneath the shaft 134.

Gear Sector 140 has an integral laterally extending crank arm 144 which is slotted as shown at 146. This slot provides an adjustable connection by means of a lug 150 and lock nut 152 to the end of a piston rod 148 which extends from one end of a pneumatic cylinder 154, the other end of this cylinder being pivotally anchored to the frame at 156 so that the piston can swing about its pivotal anchor during movement of the piston rod 148 as shown in FIGS. 8 and 15. It will be apparent that movement of the piston rod will cause rotation of the gear section 140 through part of a revolution, rotation of the shaft 134 and by virtue of the bevel gear and pinion 132, 126, rotation of the shaft 74.

It is desirable to provide gauging means to control the length stripped during operation. In the disclosed embodiment, a gauging means is provided in the form of a rod 158 which extends through the hollow center of the shaft 74 and the end of which is proximate to the blades 8, 8'. Rod 158 is threaded at 160 in the vicinity of the lefthand end of the boss 78 and the inside of the shaft has complementary threads. Rod 158 projects leftwardly beyond the end of the beveled pinion 126 and has exposed threads adjacent to the end of the shaft 74. A lock nut is provided on these exposed threads to lock the rod 158 in a predetermined position.

When it is desired to change the position of the rod 158, to increase or decrease the length of insulation removed, the lock nut 162 is loosened and the rod 158 is turned in the appropriate direction by means of a knob 164. The position of the rod is thus adjusted by the action of the threads 160 and after the rod is properly positioned, the lock nut 162 is tightened against the end of the shaft 74.

OPERATION

At the beginning of the operating cycle, the parts will be in the positions of FIG. 8. The operator first inserts the twisted pair through the openings 63, 60, and 88 until the end of the pair engages righthand end of the rod 158. The rearward side of the piston cylinder 68 is then pressurized to drive the clamping ram 64 inwardly and clamp the pair against the surface 61. The righthand side of the piston cylinder 116 is then pressurized to cause the lever 108 to swing through a clockwise arc and move the camming collar 104 from the position of FIG. 8 to the position of FIG. 10. This movement of the camming collar causes closing movement of the insulation stripping blades 8, 8' so that the pair will be captured in the plane of the stripping blades. The piston cylinder 154 is then pressurized to cause rotation of the gear sector 140 and by virtue of the gear train 138, 132, and 126, to cause several complete revolutions of the shaft 74. The untwisting head 70 rotates with the shaft and the pair is untwisted along that portion of its length extending between the clamping ram 64 and the stripping blades 8, 8'. It will be apparent that the head 70 should be rotated in the direction of the lay or twist in the pair. The number of turns of the head 70 during each operating cycle should be equal to the number of turns in the pair between the ram 64 and the blades 8, 8'. The position of the coupling 150, 152 of the crank 144 to the piston rod 148 can be set to result in the desired number of turns.

After completion of the untwisting operation, pressure is relieved from the rearward side of the piston cylinder 68 to cause retraction of the ram 64 and releases of the pair by this ram. While the blades 8, 8' remain in their closed condition, the operator pulls the pair from the head 70 to remove the insulation from the portions of the wires which extend inwardly beyond the blades. This same pulling operation results in untwisting of the turns in the pair which are between the blades and the ends of the wires.

Subsequently, the lefthand side of the piston cylinder 116 is pressurized to return the lever 88 to the position of FIG. 8 and the righthand side of the piston cylinder 154 is pressurized to return the gear section 140 to the position of FIG. 14. During the return of these parts to their normal positions, the head 70 will be rotated in the direction opposite to the direction it rotates during the untwisting operation. During such rotation of the head, the segments of insulation will be ejected through one of the slots 85 under the influence of centrifugal force.

The foregoing description assumes that the piston cylinders 68, 116, and 154 are double acting in which case suitable pneumatic controls can be provided to pressurize the appropriate ends of the cylinders at the appropriate stages of the operating cycle. Alternatively, more simplified controls can be used if these cylinders are single acting and have internal springs to return their pistons to the starting positions.

It will be apparent from the foregoing description that the blades 8, 8' in the embodiment of FIG. 8 serve as clamps for the twisting pair after they have moved to their closed positions and during rotation of the head 70. If it is desired to simply untwist the pair rather than to remove insulation, clamping plates can be substituted for the plates 8, 8'.

The head 70 rotates in the direction of the lay or twist of the pair as observed from the vantage point of the face plate 84. The effect of rotating the head 70 can also be achieved by rotating the clamping block 59 in the direction of the lay of the pair or even by rotating both the clamping block and the head.

Other modifications within the scope of the appended claims will be apparent to those skilled in the art. For example, the clamping block 59 can be adjustably mounted for movement towards and away from the head 7 to permit untwisting of different lengths of wire. This clamping block can also be provided with a means to cause movement thereof a short distance away from the stripping head at the conclusion of the untwisting operation to pull the pair from between the insulation cutting blades and thereby spare the operator of this task.

What is claimed is:

1. Apparatus for untwisting the two wires of a twisted wire pair and substantially simultaneously stripping insulation from the end portions of said wires, said apparatus comprising:

first clamping means for clamping said twisted pair thereon against rotation at a location remote from the end of said pair, second clamping means for clamping said twisted pair thereon at a location adjacent said end of said pair, said second clamping means comprising a pair of opposed cutting blades which are movable relatively towards each other into surrounding relationship to said pair while cutting at least partially through the insulation of each wire of said pair, and means for rotating said clamping means relative to each other in opposite directions about the axis of a twisted pair held in said clamping means whereby, upon clamping of said pair in said first and second clamping means with concomitant cutting of the insulation of said wires of said pair by said second clamping means, and upon relative rotation of said clamping means in the direction of the lay of said pair, said pair will be untwisted between said first and second clamping means, and upon pulling of said pair from said second clamping means, the insulation will be stripped from the end portions of said wires.

2. Apparatus as set forth in claim 1 wherein said means for rotating said clamping means comprises means for rotating said second clamping means only.

3. Apparatus as set forth in claim 2 wherein said cutting blades are mounted in a head member, said head member being mounted on a shaft for rotation therewith, said means for rotating said clamping means comprising means for rotating said shaft.

4. Apparatus as set forth in claim 3 wherein said shaft is hollow and is adapted to receive end portions of said pair, and adjustable stop means in said shaft adapted to be engaged by said pair to gauge the length of insulation stripped from said wires of said pair.

5. Apparatus for untwisting the two wires of a twisted wire pair and substantially simultaneously stripping insulation from the end portions of said wires, said apparatus comprising:

a first clamping means for clamping said twisted pair against rotation at a location adjacent to the end of said pair, an untwisting and stripping head, means for rotating said head in both directions about an axis extending centrally through said head and coinciding with the axis of a twisted pair held in said first clamping means and extending towards said head, a pair of insulation cutting blades in said head, said blades being on opposite sides of said axis, said blades being normally in an open position relative to each other in which said blades are spaced apart, said blades being movable towards each other to a closed position, said blades constituting a second clamping means, said blades having leading ends which are opposed to each other, cooperable insulation cutting edges on said leading ends, said edges surrounding said axis when said blades are in said closed position and penetrating at least partially through the insulation of the two wires of a twisted pair clamped in said first clamping means and extending along said axis towards, and into said head, and blade moving means for moving said blades from said open position to said closed position, said blade moving means being effective to maintain said blades in said closed position during rotation of said head whereby, upon positioning said pair on said axis with its end portion extending from said first clamping means past said blades, and upon movement of said blades to said closed position, and upon rotation of said head in the direction of the lay of said pair, the insulation of both wires of said pair will be circumferentially cut by said cutting edges and said pair will be untwisted between said head and said first clamping means, and upon pulling of said pair from between said blades, the insulation will be removed from the portions of said wires which extend beyond said blades.

6. Apparatus as set forth in claim 5 wherein said head is secured to a shaft in alignment with said axis, said means for rotating said head comprising means for rotating said shaft.

7. Apparatus as set forth in claim 6 wherein said blade moving means comprises camming means on said shaft.

* * * * *